(12) United States Patent
Kondou et al.

(10) Patent No.: US 7,828,097 B2
(45) Date of Patent: Nov. 9, 2010

(54) CONSTRUCTION MACHINE

(75) Inventors: Masami Kondou, Chikugo (JP); Hideki Seino, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 349 days.

(21) Appl. No.: 11/994,795

(22) PCT Filed: Jan. 19, 2006

(86) PCT No.: PCT/JP2006/300733

§ 371 (c)(1),
(2), (4) Date: May 8, 2008

(87) PCT Pub. No.: WO2007/004327

PCT Pub. Date: Jan. 11, 2007

(65) Prior Publication Data

US 2009/0199792 A1 Aug. 13, 2009

(30) Foreign Application Priority Data

Jul. 5, 2005 (JP) .............................. 2005-196871

(51) Int. Cl.
*B60K 11/00* (2006.01)

(52) U.S. Cl. ..................................... 180/68.1; 180/68.4

(58) Field of Classification Search ................ 180/68.1, 180/68.4, 68.6, 69.24; 280/159, 847; 296/193.1; 165/99, DIG. 93–DIG. 99, DIG. 311–DIG. 313, 165/DIG. 335, DIG. 337, DIG. 340

See application file for complete search history.

(56) References Cited

U.S. PATENT DOCUMENTS 3,297,080 A * 1/1967 Williams et al. .............. 165/77

(Continued)

FOREIGN PATENT DOCUMENTS

JP 10-47061 2/1998

(Continued)

OTHER PUBLICATIONS

International Search Report mailed on Mar. 20, 2006 for International Application No. PCT/JP2006/300733 filed on Jan. 19, 2006, 4 pg.

(Continued)

*Primary Examiner*—J. Allen Shriver, II
*Assistant Examiner*—Jacob Meyer
(74) *Attorney, Agent, or Firm*—Sterne, Kessler, Goldstein & Fox P.L.L.C.

(57) ABSTRACT

An object is to provide a construction machine containing an engine (30) and a heat exchanger (31) in a bonnet (14), adapted for easy cleaning of a side of the heat exchanger (31) toward a cooling fan.

A space (29) into which a hand can be put is provided between a cooling fan 33 attached to the engine (30) and the heat exchanger (31) arranged so as to face to the cooling fan (33). A part covering a region from the cooling fan (33) to the heat exchanger (31) in the bonnet (14) from above and sides includes a separate cover (34). An opening part having a guard (36) is provided through a portion of the cover (34), the portion facing to the heat exchanger (31). The cover (34) is configured to be openable and closable. The cooling fan (33) is adapted to be of a discharge type. A plurality of the heat exchangers are arranged in a same plane.

5 Claims, 8 Drawing Sheets

U.S. PATENT DOCUMENTS

| | | | | |
|---|---|---|---|---|
| 3,334,704 | A * | 8/1967 | Gehrke et al. | 180/68.4 |
| RE27,632 | E * | 5/1973 | Placket | 237/2 A |
| 3,834,478 | A * | 9/1974 | Alexander et al. | 180/68.6 |
| 4,071,009 | A * | 1/1978 | Kraina | 123/198 E |
| 4,287,961 | A * | 9/1981 | Steiger | 180/68.4 |
| 4,696,361 | A * | 9/1987 | Clark et al. | 180/68.4 |
| 5,219,016 | A * | 6/1993 | Bolton et al. | 165/41 |
| 5,234,051 | A * | 8/1993 | Weizenburger et al. | 165/41 |
| 5,509,972 | A * | 4/1996 | Akazawa et al. | 134/26 |
| 5,676,197 | A * | 10/1997 | Diebold et al. | 165/41 |
| 5,785,139 | A * | 7/1998 | Freedy et al. | 180/68.1 |
| 6,092,616 | A * | 7/2000 | Burris et al. | 180/68.1 |
| 6,298,906 | B1 * | 10/2001 | Vize | 165/41 |
| 6,318,450 | B1 * | 11/2001 | Acre | 165/67 |
| 6,385,968 | B1 * | 5/2002 | Gustafsson et al. | 60/320 |
| 6,405,825 | B1 * | 6/2002 | Yabe et al. | 181/204 |
| 6,435,264 | B1 * | 8/2002 | Konno et al. | 165/41 |
| 6,688,424 | B1 * | 2/2004 | Nakada et al. | 181/224 |
| 6,745,860 | B2 * | 6/2004 | Yabe | 180/68.1 |
| 6,827,129 | B2 * | 12/2004 | Ozawa et al. | 165/67 |
| 6,880,656 | B2 * | 4/2005 | Pfusterschmid et al. | 180/68.4 |
| 6,901,903 | B2 * | 6/2005 | Nakajima et al. | 123/198 E |
| 6,907,916 | B2 * | 6/2005 | Koyama | 165/67 |
| 6,910,529 | B2 * | 6/2005 | Stone et al. | 165/299 |
| 7,089,994 | B2 * | 8/2006 | Esposito et al. | 165/42 |
| 7,128,178 | B1 * | 10/2006 | Heinle et al. | 180/68.4 |
| 7,131,422 | B2 * | 11/2006 | Kimura et al. | 123/198 E |
| 7,134,518 | B2 * | 11/2006 | Arai et al. | 180/68.1 |
| 7,134,519 | B2 * | 11/2006 | Imashige | 180/69.24 |
| 7,182,164 | B2 * | 2/2007 | Merlo | 180/68.1 |
| 7,204,329 | B2 * | 4/2007 | Pfohl et al. | 180/68.3 |
| 7,255,189 | B2 * | 8/2007 | Kurtz et al. | 180/68.4 |
| 7,261,173 | B2 * | 8/2007 | Kurtz et al. | 180/69.2 |
| 7,370,690 | B2 * | 5/2008 | Rasset et al. | 165/41 |
| 7,398,847 | B2 * | 7/2008 | Schmitt | 180/68.4 |
| 7,401,672 | B2 * | 7/2008 | Kurtz et al. | 180/68.4 |
| 7,513,326 | B2 * | 4/2009 | Miyachi | 180/68.4 |
| 7,690,460 | B2 * | 4/2010 | Sakitani et al. | 180/68.1 |
| 2001/0006128 | A1 * | 7/2001 | Contoli et al. | 180/68.4 |
| 2001/0007292 | A1 * | 7/2001 | Yabf | 180/68.1 |
| 2002/0074174 | A1 * | 6/2002 | Dettling et al. | 180/68.1 |
| 2003/0168269 | A1 * | 9/2003 | Pfusterschmid et al. | 180/68.4 |
| 2004/0129407 | A1 * | 7/2004 | Stone et al. | 165/41 |
| 2004/0173395 | A1 * | 9/2004 | Arai et al. | 180/68.1 |
| 2004/0188157 | A1 * | 9/2004 | Miyachi | 180/68.4 |
| 2005/0211483 | A1 * | 9/2005 | Pfohl et al. | 180/68.1 |
| 2005/0279548 | A1 * | 12/2005 | Kurtz et al. | 180/68.6 |
| 2006/0000429 | A1 * | 1/2006 | Stone et al. | 123/41.49 |
| 2007/0215400 | A1 * | 9/2007 | Kurtz et al. | 180/68.6 |
| 2007/0272459 | A1 * | 11/2007 | Moen et al. | 180/68.1 |
| 2008/0053129 | A1 * | 3/2008 | Follette et al. | 62/244 |
| 2008/0110201 | A1 * | 5/2008 | Honda et al. | 62/515 |
| 2008/0169142 | A1 * | 7/2008 | Kinoshita et al. | 180/68.1 |
| 2008/0230291 | A1 * | 9/2008 | Kersting | 180/68.4 |

FOREIGN PATENT DOCUMENTS

| | | |
|---|---|---|
| JP | 2001-323506 | 11/2001 |
| JP | 2002-371590 | 12/2002 |
| JP | 2004-225625 | 8/2004 |
| JP | 2004-352089 | 12/2004 |
| JP | 2005-16847 | 1/2005 |
| JP | 2005-76580 | 3/2005 |
| JP | 2008128077 A * | 6/2008 |

OTHER PUBLICATIONS

Supplementary European Search Report for European Application No. EP06711979 dated Jan. 16, 2009, 3 pg.

* cited by examiner (a)

(b)

CONSTRUCTION MACHINE

TECHNICAL FIELD

The present invention relates to a heat exchanger provided for an engine of a construction machine, and more particularly to a technique for facilitating cleaning of an air inlet part of the heat exchanger.

BACKGROUND ART

A radiator is arranged for an engine as a heat exchanger to cool a cylinder block and the like. The radiator is adapted such that a radiator core is arranged between an upper tank and a lower tank; the lower tank is connected to a water pump via a hose or the like to convey cooling water, which has been cooled by heat exchanging at the radiator core, to a water jacket of the engine; and the cooling water, which has been warmed by cooling the engine, is returned to the upper tank via a hose. The radiator core is improved in terms of radiation performance by arranging a large number of fine tubes between the upper tank and the lower tank in a longitudinal direction, and arranging in parallel a large number of fins orthogonally to the tubes or arranging a wavy corrugated fin between any neighboring two of the tubes. Also, for the purpose of further cooling, a cooling fan is arranged so as to face to the radiator core, and a filter is arranged between the cooling fan and the radiator core to prevent the radiator core from clogging.

The clogging of the radiator core or filter occurs with long-term use, and in particular, if work such as dismantlement of a building is performed with use of a construction machine such as a power shovel equipped with the radiator, fibriform dust such as glass fibers used as a heat insulating material is deposited on the heat exchanger, which is likely to cause overheating, so that it is necessary to clean it every time the overheating occurs. To facilitate the cleaning work, there is publicly known a technique in which a dust capture net can be taken out and in along a rail in a vertical direction (see, for example, Patent document 1). Also, a technique in which the heat exchanger (radiator) is made removable is publicly known (see, for example, Patent document 2). This technique is adapted to remove the heat exchanger by separating an upper partition wall from a lower partition wall, and then unscrewing bolts from a seat part.

However, the technique described in Patent document 1 is not preferable because if a mesh of the net is made fine enough to capture the glass fibers, the net is clogged in a short time, and therefore the cleaning work should be more frequently performed. Also, in the technique described in Patent document 2, because the upper and lower tanks are respectively connected with hoses, a range within which the heat exchanger can be moved is limited, which not only makes it difficult to place and clean the heat exchanger at a desirable position, but also twists or removes the hoses, thus creating excessive work.

On the other hand, in recent years, a gap between the cooling fan and the heat exchanger is allocated so as to be considerably small so that an engine room can compactly contain the engine, heat exchanger, hydraulic instruments, and the like to be downsized, however, this is in a state where it is almost difficult to put a hand into the gap to perform maintenance, and therefore decomposition is the only way to perform the maintenance. Also, in the case of a cabin specification, an air conditioner is allocated, and the heat exchanger such as a condenser and oil cooler is also contained in a bonnet, so that the gap between the heat exchanger and the cooling fan becomes narrower.

Patent document 1: Japanese Unexamined Patent Publication No. 1998-47061

Patent document 2: Japanese Unexamined Patent Publication No. 2001-323506

DISCLOSURE OF THE INVENTION

Problems to be Solved by the Invention

A problem to be solved is to provide a positional configuration of the heat exchanger and engine, which is capable of facilitating the cleaning work of the filter, radiator core, and the like, without removing the filter and heat exchanger.

Means Adapted to Solve the Problems

A construction machine according to the present invention is adapted to contain in a bonnet an engine, a cooling fan attached to the engine, and a heat exchanger arranged so as to face to the cooling fan, wherein a shroud is provided so as to surround a space between the cooling fan and the heat exchanger in the bonnet, and a maintenance hole for putting a hand into the space therethrough is provided through an upper face of the shroud.

The construction machine according to the present invention is adapted such that a splitter for changing a blowing direction of cooling wind from the cooling fan is removably arranged in the space between the cooling fan and the heat exchanger, the space being surrounded by the shroud.

The construction machine according to the present invention is adapted such that a plate-like attaching plate is removably attached to an upper face of the shroud so as to cover the maintenance hole, and the splitter is vertically installed downward from the attaching plate through the maintenance hole.

The construction machine according to the present invention is adapted such that a part covering a region from the cooling fan to the heat exchanger in the bonnet from above and sides includes a separate cover; an opening part having a guard is provided through a portion of the cover, the portion facing to the heat exchanger; and the cover is openable and closable.

The construction machine according to the present invention is adapted such that the cooling fan arranged in the bonnet is of a discharge type.

The construction machine according to the present invention is adapted such that a plurality of the heat exchangers are arranged in a same plane.

The construction machine according to the present invention is adapted such that the space arranged between the cooling fan and the heat exchanger is in a substantially triangular shape in a plan view.

EFFECTS OF THE INVENTION

The construction machine according to the present invention is adapted to contain in a bonnet an engine, a cooling fan attached to the engine, and a heat exchanger arranged so as to face to the cooling fan, wherein a shroud is provided so as to surround a space between the cooling fan and the heat exchanger in the bonnet, and a maintenance hole for putting a hand into the space therethrough is provided through an upper face of the shroud, so that it becomes possible to insert a hand into the space between the cooling fan and the heat exchanger through the maintenance hole of the shroud, and remove dirt, dust, and the like attached to a core part of the heat exchanger, which have never been able to be removed even by blowing compressed water, air, or the like toward the heat exchanger, and therefore cleaning work can be performed throughout. Also, the large space is formed between the engine and the heat exchanger, so that influence of radiation heat from the engine becomes smaller, and therefore cooling efficiency is improved.

The construction machine according to the present invention is adapted such that a splitter for changing a blowing direction of cooling wind from the cooling fan is removably arranged in the space between the cooling fan and the heat exchanger, the space being surrounded by the shroud, so that the splitter can change the blowing direction of the cooling wind from the cooling fan to feed the cooling wind throughout the heat exchanger such as a radiator or oil cooler, and therefore the cooling efficiency can be improved. Also, noise leaking outside from the bonnet can be reduced. Further, maintenance, or the like, of the cooling fan or heat exchanger can be easily performed if the splitter is removed.

The construction machine according to the present invention is adapted such that a plate-like attaching plate is removably attached to the upper face of the shroud so as to cover the maintenance hole, and the splitter is vertically installed downward from the attaching plate through the maintenance hole, so that the splitter can be attached or removed with a simple configuration. Also, the bonnet can be opened to remove the splitter from above, and therefore it becomes possible to insert a hand from the maintenance hole to perform maintenance of the cooling fan or heat exchanger.

The construction machine according to the present invention is adapted such that a part covering a region from the cooling fan to the heat exchanger in the bonnet from above and sides includes a separate cover; an opening part having a guard is provided through a portion of the cover, the portion facing to the heat exchanger; and the cover is openable and closable, so that it becomes possible to insert a hand into the space between the cooling fan and the heat exchanger from above, rear, or side to perform the cleaning work if the cover is simply opened, and therefore the cleaning work of an outside of the heat exchanger can be easily performed from the side (outside). Also, the heat exchanger can be opened to the outside separately from a main body of the bonnet, so that it is not necessary to open the entire bonnet for the purpose of the cleaning work, and also the dust and the like are not scattered into the bonnet on the engine side at the time of cleaning work.

The construction machine according to the present invention is adapted such that the cooling fan arranged in the bonnet is of a discharge type, so that water or air can be laterally discharged to the heat exchanger from the outside being in a direction opposite to a discharging direction, and therefore the dust and the like attached to the heat exchanger can be blown out or washed out to be thereby easily removed.

The construction machine according to the present invention is adapted such that a plurality of the heat exchangers are arranged in a same plane, so that the plurality of heat exchangers are arranged in a state where the space between the cooling fan and the heat exchanger is kept large enough to put a hand inside, and therefore a hand can be inserted into the space to clean any of the heat exchangers.

The construction machine according to the present invention is adapted such that the space arranged between the cooling fan and the heat exchanger is in a substantially triangular shape in a plan view, so that in the case of the bonnet in a power shovel of a type having a small swing radius at the rear, or the like, the heat exchanger can be brought to well fitting in place, and a wasted space can be eliminated, while the space for inserting a hand inside is provided.

BRIEF DESCRIPTION OF THE DRAWINGS

FIG. 4 (*b*) is a rear view illustrating a state where the bonnet is opened and water is discharged to the heat exchanger for cleaning.

DESCRIPTION OF REFERENCE NUMERALS

14: Bonnet
29: Space
30: Engine
31: Heat exchanger
33: Cooling fan
34: Cover
36: Guard
42: Shroud
42*a*: Maintenance hole
46: Splitter
47: Attaching plate

BEST MODE FOR CARRYING OUT THE INVENTION

Figure 1:
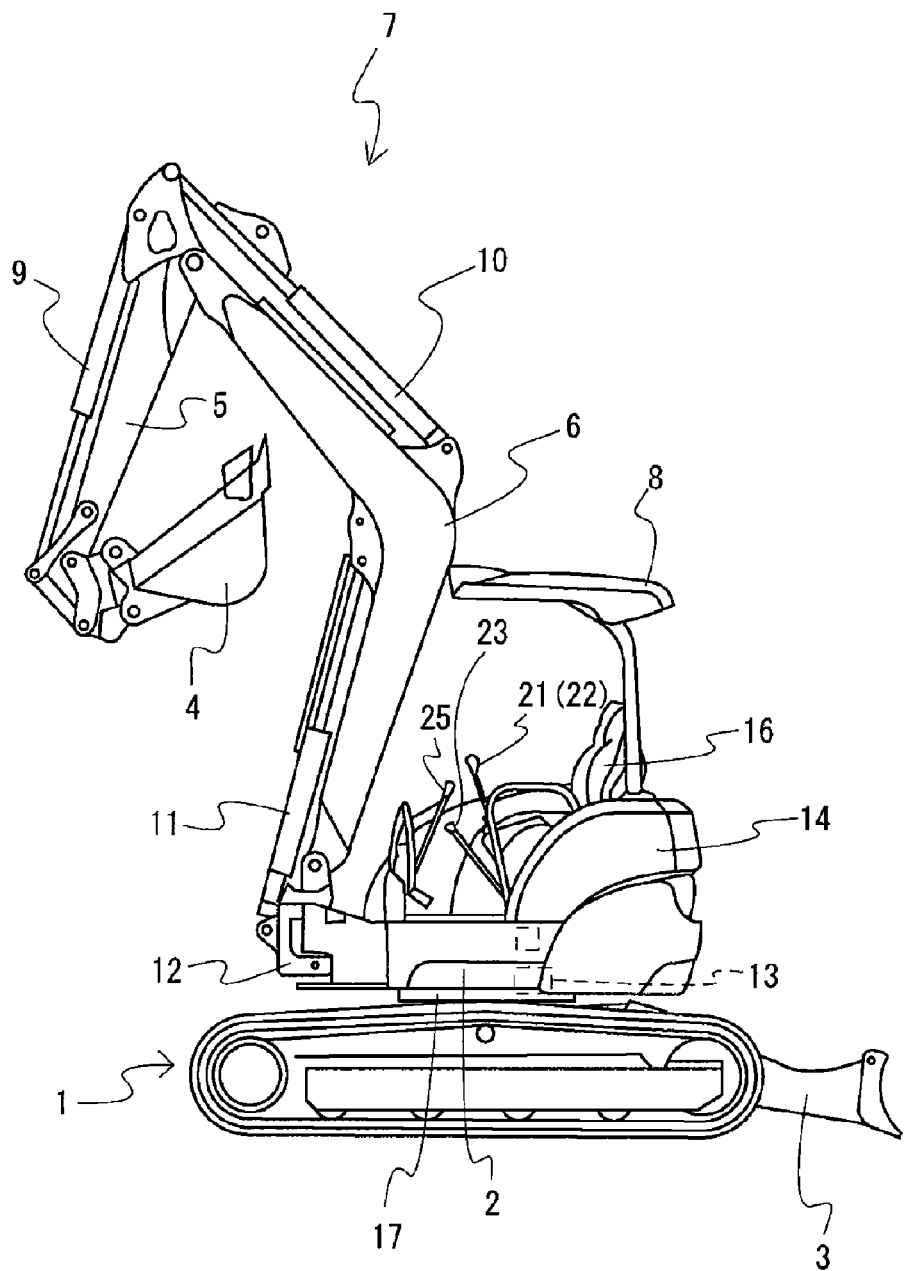
FIG. 1 is a side view of the whole of an excavation working vehicle as the construction machine of the present invention equipped with the heat exchanger.

First, as an excavation working vehicle that is one of construction machines of the present invention each equipped with a heat exchanger, a power shovel is described as an embodiment. In FIG. 1, the power shovel is attached with a working machine 7 in a front part of the main machine; the main machine supports a rotation frame 2 in the center of an upper face of a crawler type traveling device 1 via a rotation table bearing 17 such that the rotation frame 2 can rotate right and left; and a hydraulic motor 13 for the rotation is arranged on the rotation frame 2. On one of a front or rear side of the crawler type traveling machine 1, a blade 3 is allocated so as to be able to rotationally move up and down. Also, a driving operation part is configured such that a bonnet 14 covering an engine and the like is allocated on the rotation frame 2; a driver's seat 16 is arranged on or in front of the bonnet 14; hydraulic operation levers 21 and 22, lock lever 23, and the like are arranged near the driver's seat 16; and a travelling lever 25, pedal, and the like are arranged in front of the driver's seat 16. Above the driving operation part, a canopy 8 is allocated.

Also, a boom bracket 12 is attached to a front end part of the rotation frame 2 so as to be able to rotationally move right and left, and a lower end part of a boom 6 is supported by the boom bracket 12 so as to be able to rotationally move up and down.

Further, the boom 6 is bent forward in its middle part, and thereby formed in a substantially dogleg shape in a side view; an arm 5 is supported by an upper end part of the boom 6 so as to be able to rotationally move; and a bucket 4, which is an attachment for work, is supported by a top part of the arm 5 so as to be able to rotationally move. The working machine 7 includes such boom 6, arm 5, bucket 4, and the like.

The boom 6 is rotationally moved by a boom cylinder 11; the arm 5 is rotationally moved by an arm cylinder 10; the bucket 4 is rotationally moved by a bucket cylinder 9; and a rotational body on the crawler type traveling device 1 is rotated by the hydraulic motor 13. The boom cylinder 11, the arm cylinder 10, and the bucket cylinder 9 includes hydraulic cylinders respectively, and these cylinders and the hydraulic motor 13 are driven so as to be extended/retracted and rotated, respectively, by switching a pilot valve (remote control valve) with a rotational movement operation of the hydraulic operation valve 21, pedal, or the like allocated in the driving operation part, then switching a main valve (control valve) based on the switching of the pilot valve, and feeding pressure oil through a hydraulic hose from the hydraulic pump allocated in the bonnet 14 on the rotation frame 2.

Figure 2:
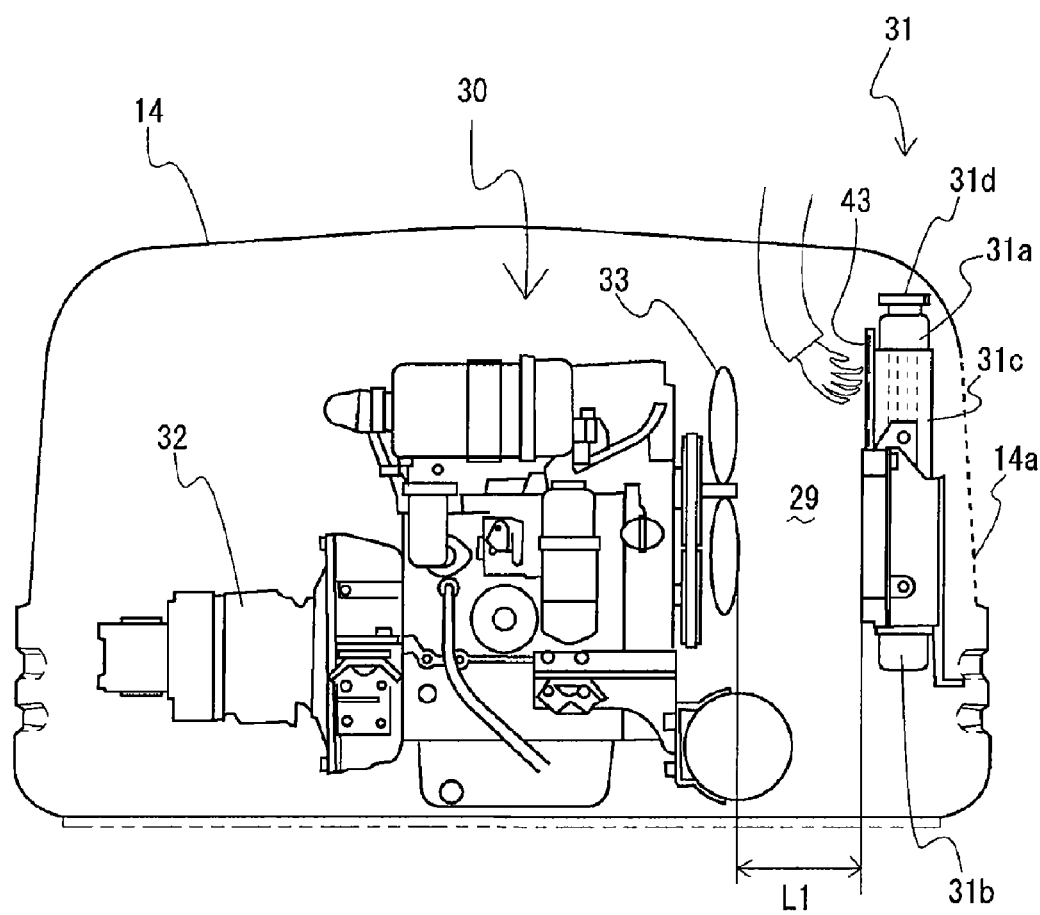
FIG. 2 is a rear view illustrating an inside of a bonnet.

Then, the heat exchanger arranged in the bonnet 14 is described, according to the present invention. As illustrated in FIG. 2, the inside of the bonnet 14 is adapted as an engine room, and the bonnet 14 contains an engine 30, radiator 31, and hydraulic pump 32, and unshown battery, hydraulic oil tank, and the like. An output shaft at one end of the engine 30 is connected with the hydraulic pump 32 to be able to drive hydraulic instruments such as the hydraulic cylinders. The output shaft at the other end of the engine 30 fixes a cooling fan 33. However, if a height of the output shaft of the engine 30 is low, and therefore a height is different between the cooling fan 33 and the radiator 31, a configuration is made such that a pulley is fixed to the output shaft such that their heights coincide with each other, and power is transmitted to the cooling fan 33 via a belt to be able to drive it.

As illustrated in FIG. 2, the radiator 31 includes an upper tank 31*a*, a lower tank 31*b*, a radiator core 31*c*, and the like; and is adapted such that an upper surface of the upper tank 31*a* is provided with a radiator cap 31*d* to be able to feed and check cooling water; the upper tank 31*a* is communicatively connected with an unshown return hose; the lower tank 31*b* is communicatively connected with a feed hose and a drain; the feed hose is connected to a cooling water pump to feed the cooling water to a water jacket of the engine for cooling; and the cooling water returns to the radiator 31 through the return hose. In this manner, the high-temperature cooling water fed from the engine 30 is accumulated in the upper tank 31*a*, and then fed from the upper tank 31*a* to the lower tank 31*b* via a large number of tubes of the radiator core 31*c*, in which the tubes are securely installed with a large number of fins to improve radiation performance. The cooling water is then fed from the lower tank 31*b* to the water jacket of the engine 30, and the like. Also, on a cooling wind side of the radiator core 31*c*, a filter 43 is removably arranged to prevent the fins from clogging.

In the present invention, between the radiator 31 and the cooling fan 33, a space 29 into which at least a hand can be put is provided. That is, as illustrated in FIG. 2, in the case where the cooling wind entering side of the radiator 31 is arranged so as to face to the cooling fan 33 of the engine 30, i.e., in the case where the radiator 31 is arranged perpendicular to a blowing direction (drive axis) of the cooling fan 33, a distance L between the radiator 31 and the cooling fan 33 is adapted as that defining the space 29 into which a hand can be inserted to perform cleaning work of the radiator 31; a distance around a span of the hand widely spread is appropriate for the distance L1; and in particular, the distance L1 is adapted to have a length of at least 20 to 30 cm. However, if the space is adapted to have the distance L1 equal to or larger than the span of the hand, an installation space for the engine 30 and heat exchanger (radiator) 31 becomes larger, and therefore cannot be contained in the engine room, so that the distance defining the space 29 into which the hand can be inserted is appropriate.

By providing between the radiator (heat exchanger) 31 and the cooling fan 33 the space 29 into which the hand can be inserted as described above, it becomes possible to directly clean the filter 43 or radiator core 31*c*, and even if a configuration is made such that the filter is not provided, or the radiator core having a coarsely meshed filter is clogged, the cleaning work can be easily performed. Also, in the case of fibriform dust, it is likely to wind around the filter or the radiator core; however, even such fibriform dust or highly adhesive dust can be directly removed with the hand to thereby prevent any residue after the removing. In addition, between the radiator 31 and the cooling fan 33, a shroud for guiding the cooling wind may be removably provided.

Figure 3:
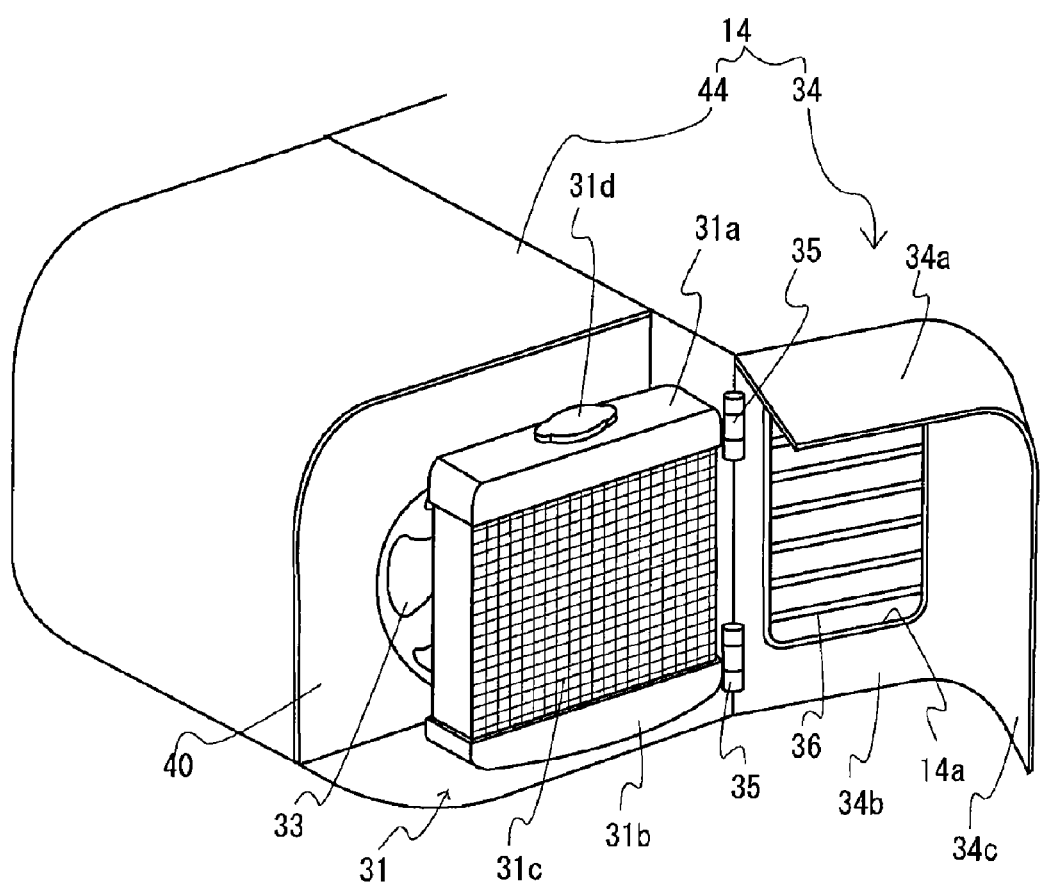
FIG. 3 is a perspective view of a radiator part with a cover opened.

Also, as illustrated in FIG. 3, the bonnet 14 covering the engine 30 includes a main cover 44 and a cover 34, and the main cover 44 and the cover 34 are adapted to respectively cover the engine 30, hydraulic pump, and the like, and three sides around the radiator 31. The cover 34 integrally includes an upper face 34*a*, a side face 34*b*, and a rear face 34*c* in substance, and is configured be openable and closable. That is, the configuration is made such that the engine room is covered by the main cover 44 and the cover 34 constituting the bonnet 14; the one side of the cover 34 is pivotally supported by the main body of the power shovel or one side of the main cover 44; and thereby the cover 34 can be rotationally moved to be opened or closed. In this embodiment, hinges 35 are provided along a vertical side of the side plate 34*b* to pivotally support the cover 34 such that the cover 34 can be rotationally moved with respect to the main body. In addition, a shielding plate 40 is provided around the cooling fan 33 to separate between rooms respectively covered by the main cover 44 and the cover 34, and adapted to prevent exchange and mixture of air in the room covered by the main cover 44 with that in the room covered by the cover 34; make the cooling wind flow in one direction; and prevent radiant heat from the engine 30 from warming the radiator core 31*c* and the like inside the cover 34.

Further, the side face 34*b* of the cover 34 facing to the radiator 31 is provided with an opening part 14*a* for discharging or drawing in the cooling wind therethrough, and in order to protect the radiator 31, the opening part 14*a* is provided with a guard 36 that is formed by placing horizontal rails or vertical rails, or formed in a grid pattern or net pattern. Sides of the upper face 34*a* and the rear face 34*c*, which face to the machine body, are extended to regions above and posterior to the cooling fan 33. In addition, in the case where the bonnet is formed in a semi-circular shape in a plan view as in a power shovel of a type having a small swing radius at the rear, or the like, a side face and a rear face are integrated.

Figure 4:
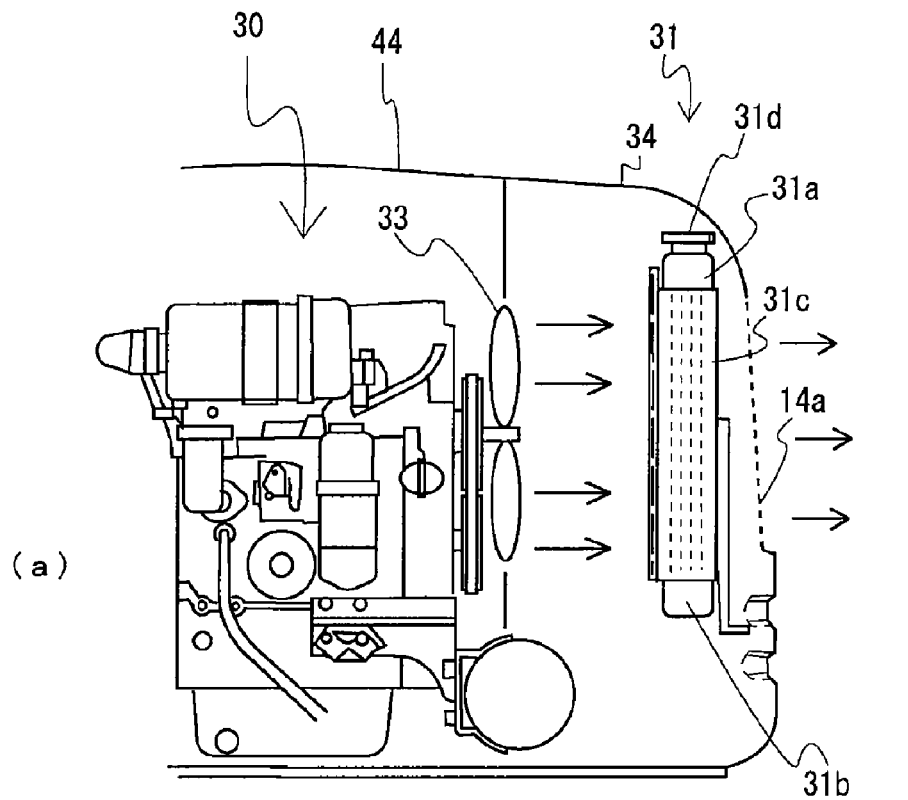
FIG. 4 (*a*) is a rear view of the engine and heat exchanger in engine operation.
Figure 4:
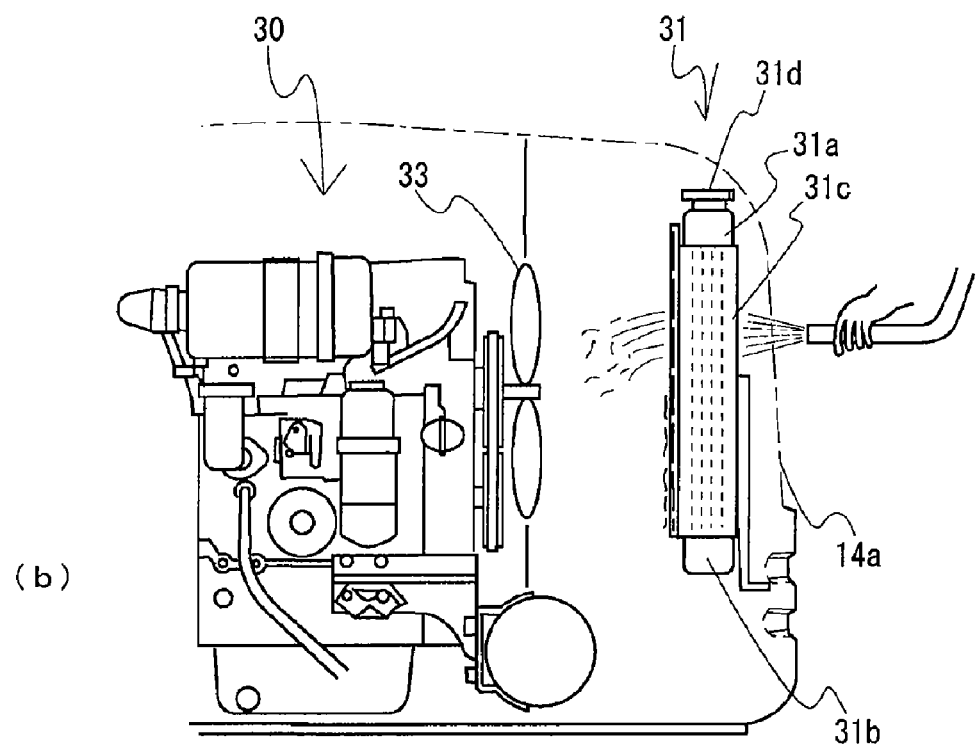

By configuring as above, the cooling wind arising from rotations of the cooling fan 33 passes through the guard 36, and is then discharged or drawn in. Also, when the clogging of the radiator 31 is removed, upper, side, and rear sides of the radiator 31 are opened to the outside by opening the cover 34, and thereby it becomes possible to perform maintenance of the outer sides of the radiator 31. In the case where the cooling fan 33 is configured to be of a discharge (blowout) type, dust is deposited on the cooling fan 33 side of the radiator 31 as illustrated in FIG. 4 (a), so that by blowing compressed air or high-pressure water from an outer side toward the radiator core 31c as illustrated in FIG. 4 (b), the deposited dust and the like can be easily removed. Also, a hand can be inserted into the space 29 between the radiator 31 and the cooling fan 33 from the above or rear side, so that dust that can be never removed with water or the like because of winding around the cooling fan 33 side of the radiator core 31c can be manually removed. In addition, even in the case of the cooling fan of a draw-in type, at least a top of a water hose can be inserted into the space between the radiator 31 and the cooling fan 33, so that it becomes possible to perform the cleaning work easily.

Figure 5:
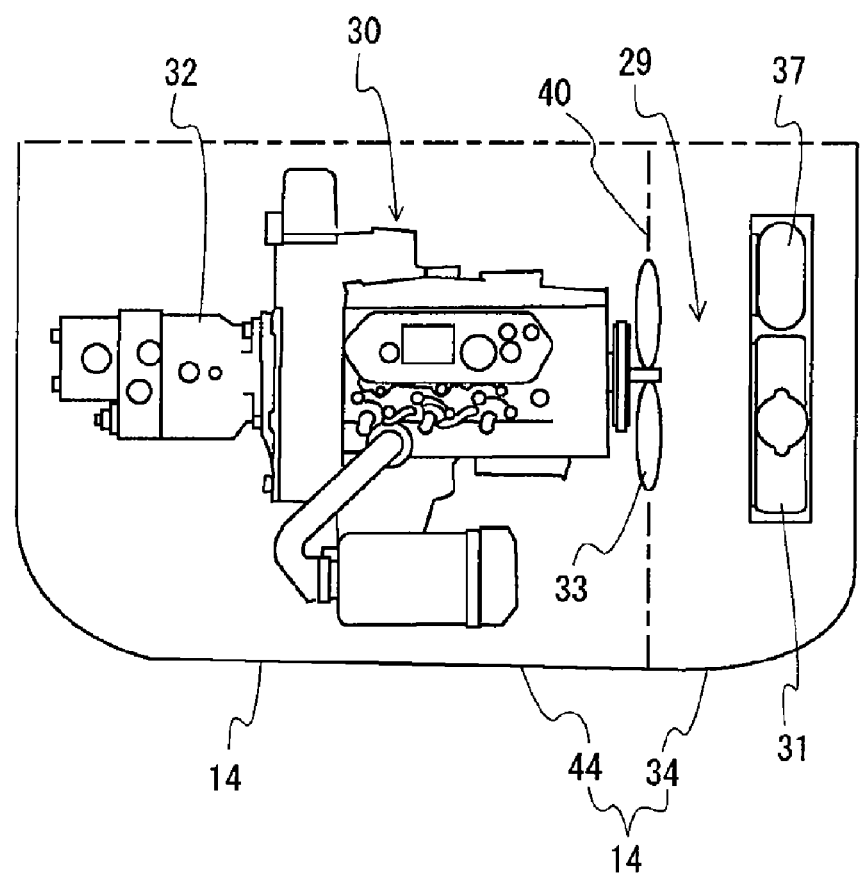
FIG. 5 is a plan view of an embodiment in which the plurality of heat exchangers are arranged.

Also, as illustrated in FIG. 5, the space 29 into which at least a hand can be put is provided between the radiator 31 and the cooling fan 33, and another heat exchanger 37 can be further arranged adjacent to the radiator 31. That is, the radiator 31, and an oil cooler 37 or heat exchanger (condenser) for an outdoor unit of an air conditioner as the heat exchanger are arranged in the same plane so as to face in a direction substantially perpendicular to the blowing direction of the cooling wind from the cooling fan 33. The radiator 31 and the oil cooler 37 are arranged in parallel back and forth so as to be overlapped with each other in a rear view but not overlapped with each other in a side view. However, the plurality of heat exchangers can be arranged not only in a lateral direction but also in a vertical direction, and in the case of the vertical direction, the heat exchangers are arranged so as to be overlapped with each other in a plan view, but not overlapped with each other in the rear and side views. That is, this arrangement is adapted such that the cooling wind passes through the plurality of heat exchangers only once, but does no consecutively pass through them.

By configuring as above, the cooling wind from the cooling fan 33 can collide with both of the radiator 31 and the oil cooler 37 at the same time to cool them, and core parts of the radiator 31 and the oil cooler 37 facing to the cooling fan can be both cleaned in the same work without hindering each other. That is, if the radiator 31 and the oil cooler 37 are arranged parallel so as to be overlapped with each other in the side view, the cooling wind enters one of the core parts to cool it after cooling the other one, and therefore cooling efficiency is reduced; however, they are laterally arranged, and therefore can be cooled by the cooling wind in the substantially same condition. Also, the cleaning work of an overlapped part between the radiator 31 and the oil cooler 37 requires removal and decomposition of one of them, resulting in time consuming work; however, in the present invention, a hand can be inserted into the space 29 between the radiator 31 and oil cooler 37 and the cooling fan 33 to easily perform the cleaning work.

Figure 6:
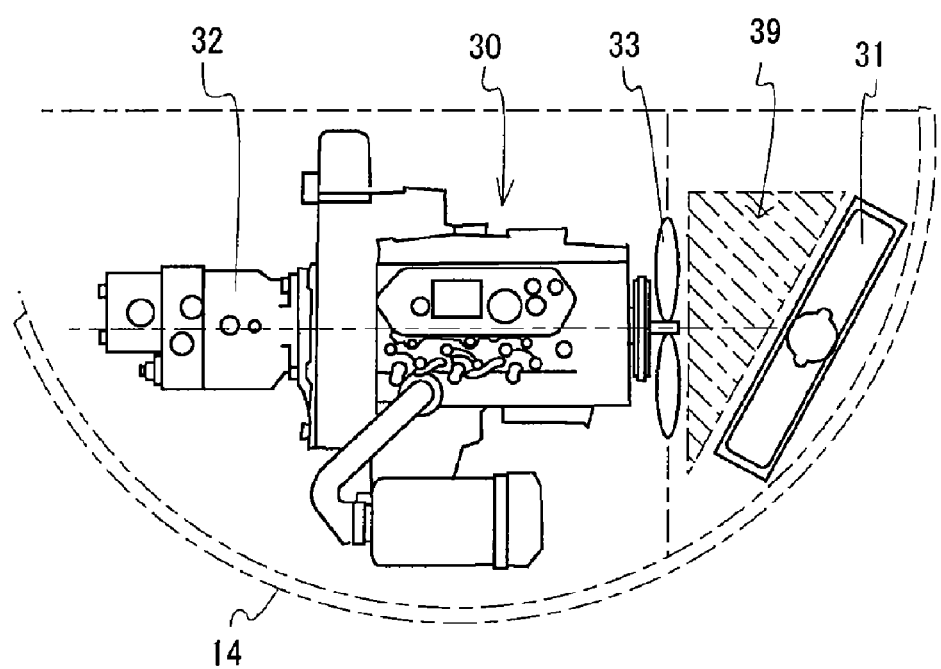
FIG. 6 is a plan view of an embodiment in which the triangular-shaped space is formed between the radiator and the cooling fan.

Also, as illustrated in FIG. 6, the radiator 31 may be obliquely arranged at a predetermined distance from the cooling fan 33. That is, in the case of the power shovel of a type having a small swing radius at the rear, a rear shape of the bonnet 14 is formed in a substantially semi-circular shape around the swing center in a plan view. For example, if the engine 30 is contained in the bonnet 14 such that a crankshaft 38 of the engine 30 is in a lateral direction, the radiator 31 is placed such that a front side thereof is opened outward, and is allocated such that an extended line of the crankshaft 38 passes through a substantially longitudinal center of the radiator 31, and a space 39 can be formed in a substantially triangular shape in the plan view between the radiator 31 and the cooling fan 33. In addition, the engine 30 is not necessarily arranged such that the crankshaft 38 is in the lateral direction, but may be obliquely arranged, so that in other words, when the engine 30 and the radiator 31 are contained in the bonnet formed in the semi-circular shaped in the plan view, longer directions of the crankshaft and radiator 31 are arranged in chord directions such that the engine 30 and radiator 31 come into contact with an inner circumference of the bonnet 14; one end of the radiator 31 is arranged so as to get close to an extended plane outside a rotational plane of the cooling fan 33; and the other end of the radiator 31 is arranged so as to get away from the rotational plane of the cooling fan 33, resulting in the formation of the space 39 in the substantially triangular shape in the plan view between the radiator 31 and the cooling fan 33. The space 39 is adapted to have a size large enough to put a hand inside.

By configuring as above, in the power shovel of a type having a small swing radius at the rear, the engine 30 and radiator come to well fitting in place, and if the radiator 33 is arranged along an arc-shaped outer circumference of the bonnet, the triangular-shaped space formed between the radiator 31 and the cooling fan 33 can be effectively used for maintenance.

Figure 7:
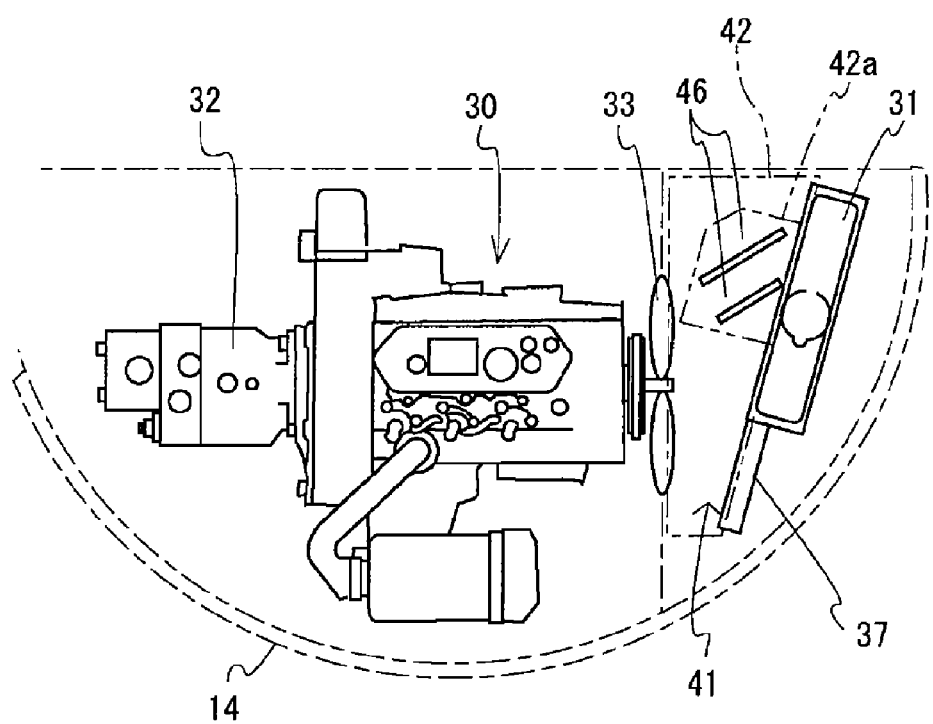
FIG. 7 is a plan view of an embodiment in which the triangular-shaped space is formed between the radiator and oil cooler and the cooling fan.
Figure 8:
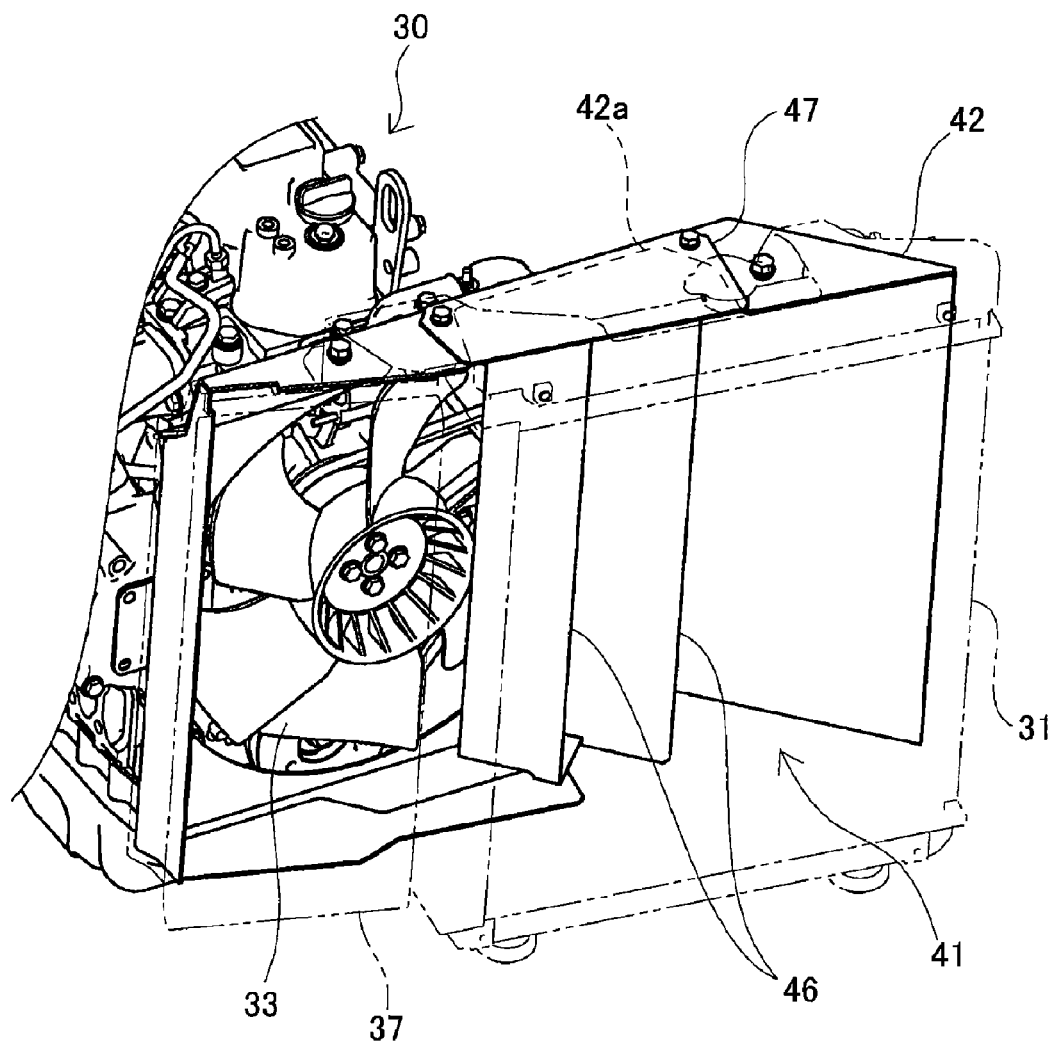
FIG. 8 is a perspective view of a splitter attaching part.

Further, as illustrated in FIGS. 7 and 8, another heat exchanger 37 can be arranged adjacent to the radiator 31 obliquely arranged with respect to the cooling fan 33. That is, in the case of the power shovel of a type having a small swing radius at the rear, the radiator 31 and the oil cooler 37 or heat exchanger (condenser) for an outdoor unit of an air conditioner as the heat exchanger are arranged in the same plane; the oil cooler 37 is installed such that a front side thereof opens outward in a plan view similarly to the radiator 31; and a space 41 is formed between the radiator 31 and the oil cooler 37 and the cooling fan 33 in a substantially triangular shape in a plan view. Then, a configuration is made such that a shroud 42 is provided inside the bonnet 14 so as to surround the space 41 to thereby prevent backflow toward the inside, and a maintenance hole 42a is opened through an upper face of the shroud 42 to be thereby able to insert a hand into the space 41.

Still further, in the space 41 inside the shroud 42, a plurality of splitters 46 are provided to change the blowing direction of the cooling wind from the cooling fan 33. These splitters 46 are attached to a plate-like attaching plate 47 at a predetermined distance in the longitudinal direction so as to be downward vertically installed; the attaching plate 47 is adapted to have a size large enough to cover the maintenance hole 42a opened through the upper face of the shroud 42; and the splitters 46 are attached so as to be inserted into the maintenance hole 42a. The splitters 46 are inserted into the space 41 inside the shroud 42 from the maintenance hole 42a such that tops of the splitters 46 are positioned near a lower end of the cooling fan 33. Then, the attaching plate 47 is removably attached to the upper face of the shroud 42 by being fixed with a bolt or the like, to thereby removably arrange the splitters 46 between the radiator 31 and the oil cooler 37 with a simple configuration. In addition, the splitters 46 are arranged obliquely with respect to the cooling fan 33 so as to have a tilt angle capable of feeding the cooling wind from the cooling fan 33 to end parts of the radiator 31 and the oil cooler 37.

By configuring as above, the blowing direction of the cooling wind from the cooling fan 33 can be changed with the splitters 46, and the cooling wind can be fed throughout the heat exchangers such as the radiator 31 and oil cooler 37 to thereby improve the cooling efficiency. Also, noise leaking outside from the bonnet 14 can be reduced. Further, it becomes possible to open the bonnet 14 and then remove the splitters 46 from above in a simple manner, so that a hand can be inserted from the maintenance hole 42 of the shroud 42a to easily perform the maintenance or the like of the cooling fan 33 and heat exchanger.

INDUSTRIAL APPLICABILITY

The construction machine of the present invention is industrially useful because the cleaning work of the filter, radiator core, and the like can be easily performed without removing the filter or heat exchanger.

The invention claimed is:

1. A construction machine comprising:
   a bonnet;
   an engine arranged in the bonnet;
   a cooling fan arranged in the bonnet and attached to the engine; and
   a heat exchanger arranged in the bonnet and arranged so as to face the cooling fan, wherein:
      a shroud is provided so as to surround a space between the cooling fan and the heat exchanger in the bonnet;
      a maintenance hole for putting a hand into the space therethrough is provided through an upper face of the shroud;
      a plate-like attaching plate is removably attached to the upper face of the shroud so as to cover the maintenance hole; and
      a splitter for changing a blowing direction of cooling wind from the cooling fan is vertically installed downward from the attaching plate through the maintenance hole so as to be removably arranged in the space.

2. The construction machine according to claim 1, wherein:
   a part covering a region from the cooling fan to the heat exchanger in the bonnet from above and sides includes a separate cover;
   an opening part having a guard is provided through a portion of the cover, the portion of the cover facing the heat exchanger; and
   the cover is configured to be openable and closable.

3. The construction machine according to claim 1, wherein the cooling fan arranged in the bonnet is adapted to be of a discharge type.

4. The construction machine according to claim 1, wherein a plurality of the heat exchangers are arranged in a same plane.

5. The construction machine according to claim 1, wherein the space arranged between the cooling fan and the heat exchanger is adapted to be in a substantially triangular shape in a plan view.

* * * * *